Aug. 17, 1948.  W. H. SILVER  2,447,097
OVERLOAD YIELDING HITCH DEVICE
Filed May 11, 1945  2 Sheets-Sheet 1

WITNESS
E. B. Bjurstrom

*INVENTOR.*
WALTER H. SILVER
BY
ATTORNEYS

Aug. 17, 1948.  W. H. SILVER  2,447,097
OVERLOAD YIELDING HITCH DEVICE
Filed May 11, 1945  2 Sheets-Sheet 2
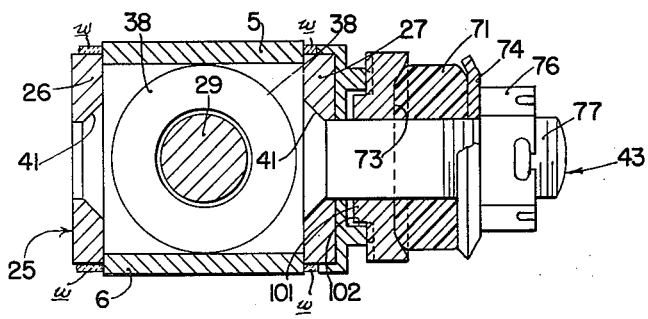
FIG. 4
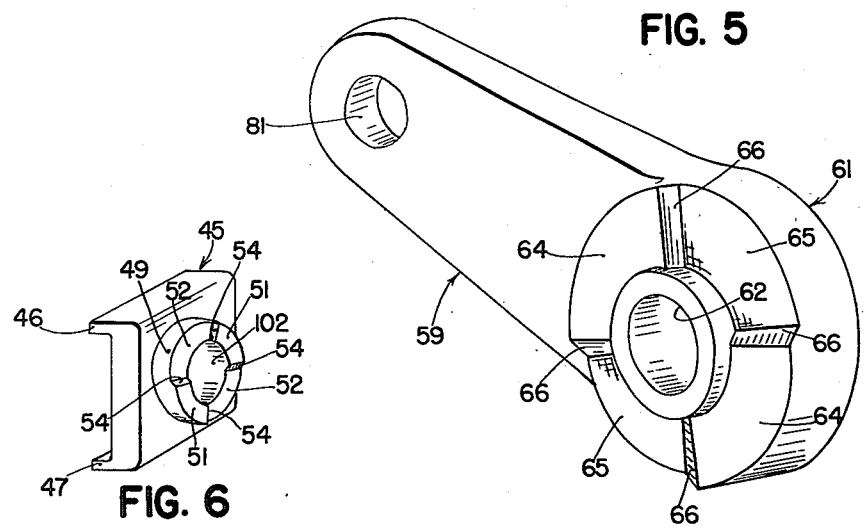
FIG. 5
FIG. 6
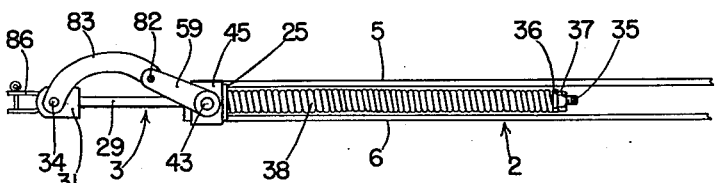
FIG. 7
INVENTOR.
WALTER H. SILVER
WITNESS
ATTORNEYS Patented Aug. 17, 1948

2,447,097

UNITED STATES PATENT OFFICE 2,447,097

OVERLOAD YIELDING HITCH DEVICE

Walter H. Silver, Moline, Ill., assignor to Deere & Company, Moline, Ill., a corporation of Illinois Application May 11, 1945, Serial No. 593,205

9 Claims. (Cl. 280—33.16)

The present invention relates generally to agricultural machines and more particularly to draft receiving and transmitting devices for agricultural implements.

The object and general nature of the present invention is the provision of a new and improved hitch for agricultural implements wherein is incorporated, first, a load responsive tripping device for relieving the hitch, as, for example, when the load becomes excessive, and second, draft cushioning means which maintains the parts of the hitch device together but which yields over a considerable distance and, by such cushioning or yielding, absorbs the shock of the overload and thereby protects both the implement and propelling means, which is usually a farm tractor.

More particularly, it is a feature of this invention to provide a hitch device especially adapted for use with tractor propelled implements in which the latter have a part or parts adapted to be operated by a hydraulic device which is connected with a source of fluid pressure on the tractor through one or more hose lines. According to the present invention, the new and improved hitch device includes a tripping device which trips under an overload and, in conjunction therewith, an especially effective cushioning device which, although it maintains the implement and tractor in connected relationship, yields over a considerable distance and thus is enabled to absorb the kinetic energy of the moving tractor when, for example, the implement suddenly strikes and becomes immobilized by some obstruction, such as a stone, stump, or the like. Normally, according to the principles of the present invention, the load-responsive tripping device acts under normal conditions to transmit the pulling load or draft directly from the tractor to the implement without imposing any appreciable loads on the cushioning device, preferably a relatively long spring, but in the event an overload does occur, then the release of the tripping device acts practically immediately to transfer the transmission of draft between the hitch parts substantially directly onto the cushioning spring, whereupon the latter yields the necessary amount to gradually bring the tractor to a standstill but without imposing excessive loads onto the implement. After the overload condition has been corrected the cushioning spring then becomes effective to restore the tripping device into its normal load-transmitting relation but nevertheless arranged so as to again be responsive to overload conditions.

These and other objects and advantages of the present invention will be apparent to those skilled in the art after a consideration of the following detailed description, taken in conjunction with the accompanying drawings.

In the drawings:

Figure 4 is a fragmentary section taken generally along the line 4—4 of Figure 2.

Figure 5 is a detail view of one of the toggle arms.

Figure 6 is a detail view of one of the cam members that cooperate with the cam means on the toggle arms.

Figure 7 is a side view of the device shown in Figure 1 while illustrating the positions of the parts after the hitch has been tripped, as by an overload.

Figure 1:
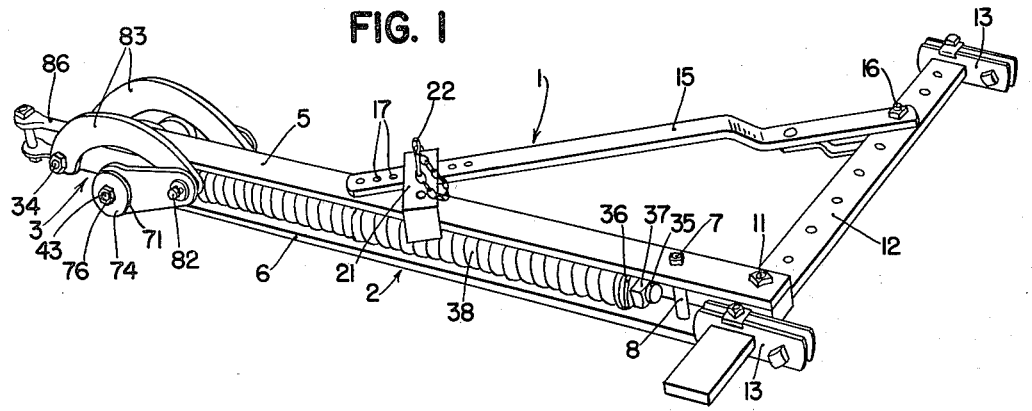
Figure 1 is a perspective view of a hitch construction for a plow or the like, in which the principles of the present invention have been incorporated.
Figure 2:
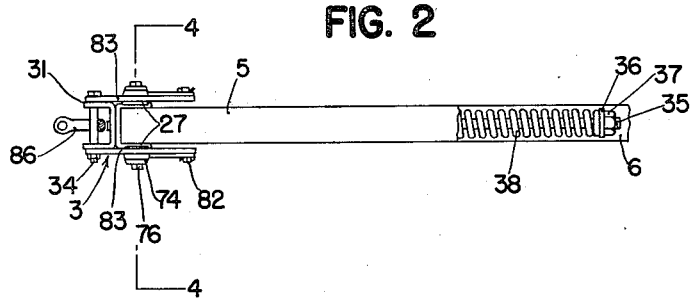
Figure 2 is a top view of the principal parts of the hitch device shown in Figure 1.
Figure 3:
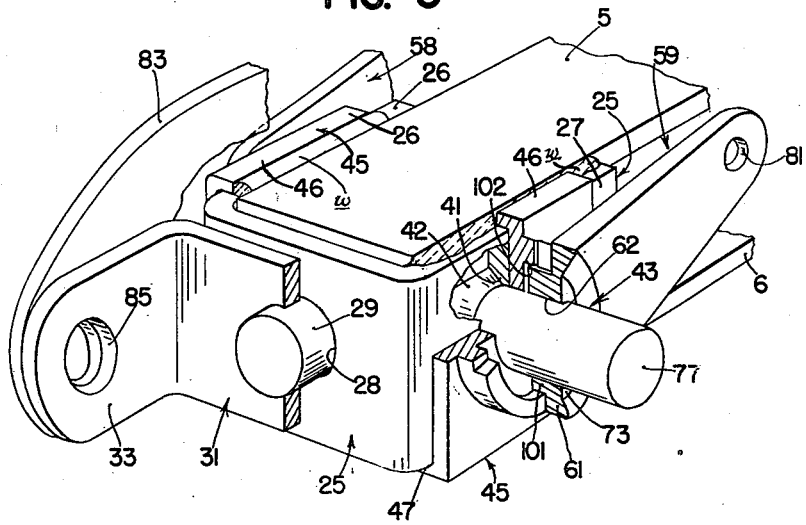
Figure 3 is an enlarged perspective view of certain parts of our improved hitch device, portions being broken away to show the construction more clearly.

Referring first to Figure 1, the reference numeral 1 indicates the hitch or draft structure for a plow which comprises substantially a pair of telescopically associated and relatively shiftable members 2 and 3, the latter being slidable within the former. The draft member 2 comprises a pair of upper and lower bars 5 and 6 connected together at their rear ends by bolt means 7 and a suitable spacer 8, the rearmost portions of the bars 5 and 6 being apertured to receive a bolt or pin 11 which connects the member 2 to the desired point along a transverse hitch bar 12, the ends of which are connected by fasteners 13 to the hitch plates of a plow or the like. A bracing bar 15 is connected, as at 16, to the transverse hitch bar 12 and at its front end is provided with a plurality of openings 17 by which the brace 15 may be connected to the intermediate portion of the hitch member 2 in different positions, depending upon what position it is desired that the front end of the hitch member 2 shall have. Preferably, a bracket 21 is fixed to the upper bar 5 and carries a releasable pin 22 which may be inserted in any one of the several openings 17. At the front end of the member 2, the upper and lower bars 5 and 6 are connected together by a U-shaped part 25, the sides 26 and 27 of which are welded or otherwise fixed to the edge portions of the bars 5 and 6, forming an integral part thereof. The central section of the U-shaped member 25 is apertured, as at 28, to receive the front end of a rod 29 which makes up the principal part of the draft member 3. The front end of the draft member 3 comprises a U-shaped yoke 31 having apertured side portions 33 receiving a draft pin 34, more detailed reference to which will be made later. The rod 29 slides through the opening 28 in the U-shaped part 25 and extends generally rearwardly between the upper and lower hitch bars 5 and 6. The rear end of the rod 29 is threaded, as at 35, and receives a washer and lock nut 36 and 37, as best shown in Figure 1. A relatively long cushioning spring 38 is disposed between the washer 36 and the front end of the member 2, the front end of the spring 38 preferably bearing against the inner surface of the front U-shaped member 25. The side portions 26 and 27 of the latter are provided with openings 41, there being one opening for each side of the part, and each opening is formed to receive the square head 42 of a plow bolt 43.

Mounted on each of the plow bolts 43 is a cam member 45 which, as best shown in Figure 6, comprises a block-like part having upper and lower flanges 46 and 47 that are adapted to overlie the outermost upper and lower edges of the associated side section of the U-shaped part 25. The parts 45 are secured in place preferably by the same welding w that connects the head 25 with the bars 5 and 6. Exteriorly, the main body of the block 45 is formed with a cam section 49 having two laterally outer portions 51 and two depressed portions 52 connected together by inclined wall sections 54. Cooperating with the cam members 45 and the associated plow bolts 43 is a pair of arms 58 and 59, each of which has a cam head 61 apertured, as at 62, to receive the associated plow bolt 43. Preferably, the arms 58 and 59 are identical and are constructed as best shown in Figure 5. The cam head 61 is formed with two laterally outer cam sections 64 and two depressed cam sections 65, connected together by inclined portions 66, these cam faces being substantially complementary with respect to the associated cam faces on the member 45. Disposed on the laterally outer portion of each of the plow bolts 43 is a resilient member 71 in the form of a bushing or annulus formed of rubber or other resilient material, and the outer face of the associated cam head 61 is formed with a recessed portion 73 in which the resilient member 71 is adapted to seat. A pressure plate in the form of a washer or the like, as indicated at 74, is applied against the outer face of each of the resilient members 71, and the amount of pressure that may be exerted against the cam head 61 may be determined by an adjusting nut 76 screwed onto the threaded end 77 of the associated plow bolt 43.

The outer end of each of the arms 58 and 59 is apertured, as at 81, to receive a pivot pin 82 by which the rear end of a link 83 is pivotally connected to the associated arm. The forward end of the link 83 is apertured to receive the pin 34 which, as described above, passes through the openings 85 in the draft yoke 31 fixed, as by welding, to the forward end of the rod 29. A clevis 86 or other suitable means serves to transmit the pulling force of the tractor to the front end of the draft member 3.

The parts and pivots are so arranged that in the normal position, with the rod member 29 fully retracted within the draft member 2 and with the yoke 31 up against the front end of the U-shaped part 25, the cam parts 64 on the two arms 58 and 59 are adapted to be received in the depressed cam sections 53 in the blocks 45, with the inclined faces 54 of the latter contacting the corresponding inclined portions 66 on the arms 58 and 59. The nuts 76 are normally tightened sufficient to hold the two pairs of nested cam members together with sufficient force so that under normal loads angular displacement of the arms 58 and 59 does not occur. This is because the axis defined by the plow bolts 43 is fairly close to a straight line joining the axis of the pins 82 and the axis defined by the hitch bolt 34. This approximately overcenter position of the arms 58 and 59 with respect to the links 83 is such that the resistance offered by the resilient elements 71 to axially outward displacement of the cam heads 61 is sufficiently great so that, under normal loads, the arms 58 and 59 remain immobilized and the draft power is transmitted from the front end of the hitch member 3 through the links 83 to the outer ends of the arms 58 and 59, such direct draft being then transmitted through the arms 58 and 59 directly to the pivot members 43 in the front end of the other draft transmitting member 2. In this connection note that each of the cam heads 61 of the arms 58 and 59 is provided with an inner bearing section 101 which is adapted to be received in a socket 102 formed in the outer face of the draft block 45. Hence, such pulling effort is transmitted directly from the rear ends of the links 83 to the rear ends of the arms 58 and 59, and from the latter member the draft is transmitted through the laterally inwardly directed section 101 of the arms to the inner opening 102 in the draft blocks 45.

However, if the implement should strike some immovable object, such as a stone, or for any reason the draft load or pull becomes excessive, the cushioning members 71 can no longer resist axial outward movement of the arms 58 and 59 so that the cam parts 64 on each arm ride up onto the laterally outer sections 51 and 52 of the stationary cam member 49. This of course accommodates a certain amount of axial displacement of the arms 58 and 59 which are now free to swing forwardly and permit the front end of the hitch member 3 to shift forwardly, as best shown in Figure 7, whereupon the load transmitted is now directed no longer through the toggle links 83 but to the draft member 2 through the spring 38. The latter is made sufficiently long so that it may absorb the momentum of the tractor and bring the latter to a standstill within a reasonable distance, or provide the operator an opportunity to disengage the tractor clutch, thus protecting both the implement and the tractor. It will also be noted that the inclined cam surfaces 54 and 66 are of relatively small angular extent, and hence it requires only a relatively small amount of angular displacement of the arms 58 and 59 for them to move from their locked and normal load transmitting position into their released position, which permits the arms 58 and 59, together with the links 83, to swing freely forwardly, interposing no further restriction to the forward movement of the draft member 3 relative to the draft member 2. It will be understood, of course, that by tightening or loosening the adjusting nuts 76, the amount of load required to break the toggle links 58 and 59 and 83 can be made whenever it is desirable. It will also be understood that, whenever the cause of the overload to which the toggle linkage 58, 59 and 83 responded is removed, the spring 38 will automatically restore the toggle links to their locked or substantially overcenter position (Figure 1).

While I have shown and described above the preferred structure in which the principles of the present invention have been incorporated, it is to be understood that my invention is not to be limited to the specific details shown and described above, but that, in fact, widely different means may be employed in the practice of the broader aspects of my invention.

What I claim, therefore, and desire to secure by Letters Patent is:

1. A hitch device comprising a pair of relatively slidable draft members normally disposed in telescoped relation, means for connecting one of said members to an implement to be propelled, means for connecting the other of said members to a propelling means, a relatively long cushioning spring means extending substantially from one end of one of said normally telescoped members to the opposite end of the other of said members, and an overload release device connected between one end of one of said members and the adjacent portion of the other member and serving to restrain relative movement therebetween until the draft transmitted becomes excessive.

2. A hitch device comprising a pair of relatively shiftable members normally disposed in overlapping relation for substantially their entire length, a relatively long cushioning spring connected at its ends to said members and extending substantially the entire length of said members for yieldably holding them in a retracted position, means at the front end of one of said members for receiving draft, a pair of arms pivotally connected together and pivotally connected, respectively, to said members and lying alongside one end portion of said spring and the associated members when said members are retracted, the pivot points being arranged so that they lie closely adjacent a straight line when said members are retracted, and means yieldably resisting angular movement of said arms and thereby locking said members against relative movement out of their retracted position and without imposing the draft on said cushioning spring until the amount of draft is sufficient to overcome said resisting means.

3. A hitch device comprising a pair of relatively shiftable members, a relatively long cushioning spring connecting said members, one of the latter having draft receiving means at its forward end, arm means pivoted to the other member, link means connecting the swinging end of said arm means with the forward end portion of said draft-receiving member, and biased cam means carried by said other members and said arm means and arranged to releasably hold said arm means in a position such that the latter and said link means occupy substantially overcenter position whereby, under normal loads, the draft is transmitted through said link means and arm means from said one member to said other member without transmitting through said cushioning spring, swinging of said arm means, as under overload conditions, after the bias of said cam means has been overcome accommodating a forward movement of said one draft-receiving member relative to the other whereby under such conditions the draft is transmitted from said one member to the other member through said cushioning spring.

4. A hitch device comprising a pair of relatively shiftable members, one of said members comprising a pair of spaced apart bars and a U-shaped part fixed to the front ends of said bars and carrying a pair of cam members, the other of said relatively shiftable members comprising a rod member slidable between said bars and through an opening in said U-shaped member, a pair of arms, each including cam means cooperating with said cam members, means pivotally connecting said arms with said U-shaped member, said cam means and cam members being shaped so that said arms have axial displacement whenever said arms are shifted angularly, means for yieldably resisting said axial displacement, link means connecting the swingable ends of said arms with the front end of said rod member, and means for applying draft to the front end of said rod member, said link means and arms being arranged substantially in an overcenter position when said cam means fully engages said cam members, whereby draft delivered to the front end of said rod member is transmitted to the other member through said link means and arms until an overload occurs, causing said arms and link means to pivot by the yielding of said axial displacement resisting means, and cushioning means accommodating an appreciable amount of shifting movement of said rod member relative to said bars after said axial displacement resisting means yields to permit an angular displacement of said arms and the resultant outward movement of said rod member relative to said bars.

5. A hitch device comprising a pair of relatively shiftable members arranged in telescoping relation, one of said members carrying a pair of cam members, a pair of arms, each including cam means cooperating with said cam members, means pivotally connecting said arms with said one member, said cam means and cam members being shaped so that said arms have axial displacement whenever said arms are shifted angularly, means for yieldably resisting said axial displacement, link means connecting the swingable ends of said arms with the adjacent portion of the other of said relatively shiftable members, and means for applying draft to said other member, said link means and arms being arranged substantially in an overcenter position when said cam means fully engages said cam members, whereby draft delivered to said other member is transmitted to said one member through said link means and arms until an overload occurs, causing said arms and link means to pivot by the yielding of said axial displacement resisting means.

6. A hitch device comprising a pair of relatively shiftable members, one of said members comprising a pair of spaced apart bars and a U-shaped part fixed to the front ends of said bars and carrying a pair of cam members, the other of said relatively shiftable members comprising a rod member slidable between said bars and through an opening in said U-shaped member, a pair of arms, each including cam means cooperating with said cam members, means pivotally connecting said arms with said U-shaped member, said cam means and cam members being shaped so that said arms have axial displacement whenever said arms are shifted angularly, means for yieldably resisting said axial displacement, link means connecting the swingable ends of said arms with the front end of said rod member, and means for applying draft to the front end of said rod member, said link means and arms being arranged substantially in an overcenter position when said cam means fully engages said cam members, whereby draft delivered to the front end of said rod member is transmitted to the other member through said link means and arms until an overload occurs, causing said arms and link means to pivot by the yielding of said axial displacement resisting means.

7. A hitch device comprising a pair of relatively shiftable members, one of said members comprising a pair of spaced apart bars, cam means fixed to one end of said one member, the other of said relatively shiftable members comprising a rod member shiftable between said bars, an arm pivotally connected with said one member and including cam means cooperating with the cam means on said one member, said cam means on said one member and said arm being shaped so that said arm has axial displacement whenever said arm is shifted angularly relatively to said one member, means for yieldably resisting said axial displacement, link means connecting the swingable end of said arm with the adjacent portion of said rod member, said link means and arm being arranged substantially in an overcenter position when said cam means are fully engaged, and spring cushioning means disposed about said rod member and connected therewith at one end thereof and at the other end with said one member, said spring cushioning means accommodating an appreciable amount of shifting movement of said rod member relative to said bars after said axial displacement resisting means yields to permit an angular displacement of said arm and the resultant relative movement of said rod member relative to said bars.

8. A hitch device comprising a pair of relatively shiftable members normally disposed in retracted telescoped relation for substantially their entire length, one of said members comprising a pair of spaced apart bars and the other member comprising a rod member shiftable between said bars, a relatively long cushioning spring bearing at one end against the adjacent portion of said one member and bearing at its other end against the opposite end of said rod member, and an overload release device connected between the other end of said rod member and said one end of said one member whereby draft delivered to one end of one member is transmitted to the other member through said overload release device until an overload occurs, whereupon the draft is transmitted between said relatively shiftable members through said cushioning spring.

9. The invention set forth in claim 8, further characterized by means for transmitting draft to one end of said rod member, said overload release device being connected with that end of said rod member and the adjacent portion of said one member.

WALTER H. SILVER.

REFERENCES CITED

The following references are of record in the file of this patent:

UNITED STATES PATENTS

| Number | Name | Date |
| --- | --- | --- |
| 1,618,714 | Lambert | Feb. 22, 1927 |
| 1,855,513 | Buckley | Apr. 26, 1932 |
| 1,974,142 | Morkovski | Sept. 18, 1934 |
| 2,102,722 | Koerting | Dec. 21, 1937 |
| 2,311,826 | Grasswick | Feb. 23, 1943 |